US012181137B2

(12) United States Patent
Chow

(10) Patent No.: US 12,181,137 B2
(45) Date of Patent: Dec. 31, 2024

(54) MODULAR AND FOLDABLE DECORATIVE LIGHT FRAME SHAPABLE INTO DIFFERENT SHAPES

(71) Applicant: Kwok On Chow, Tai Po (HK)

(72) Inventor: Kwok On Chow, Tai Po (HK)

( * ) Notice: Subject to any disclaimer, the term of this patent is extended or adjusted under 35 U.S.C. 154(b) by 0 days.

(21) Appl. No.: 18/235,892

(22) Filed: Aug. 21, 2023

(65) Prior Publication Data

US 2024/0392957 A1 Nov. 28, 2024

(30) Foreign Application Priority Data

May 24, 2023 (CN) ........................ 202321277105.2

(51) Int. Cl.
*F21V 21/28* (2006.01)
*F21S 2/00* (2016.01)
(Continued)

(52) U.S. Cl.
CPC .............. *F21V 21/28* (2013.01); *F21V 21/35* (2013.01); *F21S 2/005* (2013.01); *F21S 4/00* (2013.01); *F21S 4/10* (2016.01); *F21S 4/15* (2016.01); *F21S 4/20* (2016.01); *F21S 4/22* (2016.01); *F21S 4/24* (2016.01); *F21S 4/26* (2016.01); *F21S 4/28* (2016.01); *F21V 1/06* (2013.01); *F21V 1/08* (2013.01); *F21V 15/012* (2013.01); *F21V 21/14* (2013.01); *F21V 21/145* (2013.01); *F21V 21/24* (2013.01); *F21V 21/26* (2013.01); *F21V 21/30* (2013.01); *F21W 2121/00* (2013.01)

(58) Field of Classification Search
CPC ........ F21S 4/00; F21S 4/10; F21S 4/15; F21S 4/20; F21S 4/22; F21S 4/24; F21S 4/26; F21S 4/28; F21S 2/005; F21V 21/14; F21V 21/145; F21V 21/26; F21V 21/30; F21V 1/06; F21V 1/08; F21V 5/012; F21V 21/24
See application file for complete search history.

(56) References Cited

U.S. PATENT DOCUMENTS 6,607,284 B1 * 8/2003 Tsai .......................... F21S 4/20 362/121
7,726,840 B2 * 6/2010 Pearson .................. F21S 2/005 362/249.02
(Continued)

FOREIGN PATENT DOCUMENTS

CN 106016065 A * 10/2016

OTHER PUBLICATIONS

Machine translation of CN 106016065 A retrieved from the FIT database of PE2E search. (Year: 2023).*

*Primary Examiner* — Colin J Cattanach

(57) ABSTRACT

A modular and foldable decorative light frame shapable into different shapes, including a plurality of first frame bodies and a plurality of second frame bodies sequentially and alternately connected end to end; each pair of adjacent first frame body and second frame body are detachably and rotatably connected through a rotational structure so that the decorative light frame can be folded and reduced in occupied space and also not required to be packaged with a specific shape; a first angle limiting latch and a second angle limiting latch are provided at two ends of each of the first frame bodies to provide fixation such that the decorative light frame can be shaped into a specific shape when being unfolded.

6 Claims, 9 Drawing Sheets

(51) Int. Cl.

| | |
|---|---|
| ***F21S 4/00*** | (2016.01) |
| ***F21S 4/10*** | (2016.01) |
| ***F21S 4/15*** | (2016.01) |
| ***F21S 4/20*** | (2016.01) |
| ***F21S 4/22*** | (2016.01) |
| ***F21S 4/24*** | (2016.01) |
| ***F21S 4/26*** | (2016.01) |
| ***F21S 4/28*** | (2016.01) |
| ***F21V 1/06*** | (2006.01) |
| ***F21V 1/08*** | (2006.01) |
| ***F21V 15/01*** | (2006.01) |
| ***F21V 21/14*** | (2006.01) |
| ***F21V 21/24*** | (2006.01) |
| ***F21V 21/26*** | (2006.01) |
| ***F21V 21/30*** | (2006.01) |
| ***F21V 21/35*** | (2006.01) |
| ***F21W 121/00*** | (2006.01) |

(56) References Cited

U.S. PATENT DOCUMENTS

2003/0198047 A1* 10/2003 Chen .......................... F21S 4/20
362/249.16
2013/0272000 A1* 10/2013 Pearson .................... F21S 4/28
362/362
2013/0279179 A1* 10/2013 Pearson .................. F21S 2/005
362/364

* cited by examiner

MODULAR AND FOLDABLE DECORATIVE LIGHT FRAME SHAPABLE INTO DIFFERENT SHAPES

BACKGROUND OF THE INVENTION

The present utility model relates to the technical field of lighting, and in particular to a modular and foldable decorative light frame shapable into different shapes.

In the prior art, when it is required to assemble a plurality of decorative lights to form a particular shape such as a sign letter, a pentagram shape, or various other special shapes, it is mostly accomplished by directly winding and binding light strings onto a base frame having the intended shape. The decorating process is time-consuming, laborious, and involves complex assembly. Moreover, wires are exposed and thereby resulting in poor waterproof performance, and furthermore, the resulting shape is often not distinct and is usually unattractive. To address the aforementioned issues, CN2588185Y discloses a kind of decorative light which involves placing light strips inside a light frame of a pre-determined shape so as to obtain a decorative light with a certain degree of aesthetic appeal and improved waterproof performance. However, the pre-determined shape of the light frame already made into a specific shape poses challenges for packaging and transportation, increasing transportation costs while making the specific-shaped light frame susceptible to damage. Therefore, there is a need to provide a foldable decorative light frame for easy storage.

BRIEF SUMMARY OF THE INVENTION

It is an object of the present utility model to address the aforementioned drawbacks and provide a modular and foldable decorative light frame shapable into different shapes to solve the issues mentioned in the background.

The present utility model is achieved by the following technical solutions:

A modular and foldable decorative light frame shapable into different shapes, comprising a plurality of first frame bodies and a plurality of second frame bodies, and the plurality of first frame bodies and the plurality of second frame bodies are sequentially and alternately connected end to end; each pair of adjacent first frame body and second frame body are detachably connected with each other through a rotational structure, and said each pair of adjacent first frame body and second frame body are also rotatable with respect to each other through the rotational structure; a first angle limiting latch and a second angle limiting latch are provided at two ends of each of the first frame bodies respectively, and each of the first angle limiting latch and the second angle limiting latch cooperatively engages with a corresponding second frame body respectively.

Further, a first abutting part and a second abutting part are provided at two ends of each of the second frame bodies respectively; and each of the first abutting part and the second abutting part cooperatively engages with a corresponding first frame body respectively.

Further, each of the first angle limiting latch and the second angle limiting latch of each of the first frame bodies is extended outwardly to form a pulling part.

Further, each of the first frame bodies and the second frame bodies is provided with a through hole at one end thereof.

Further, the rotational structure connecting said each pair of adjacent first frame body and second frame body comprises a rotational shaft and a shaft sleeve provided on the first frame body and the second frame body respectively; the rotational shaft is inserted into the shaft sleeve; the rotational shaft and the shaft sleeve are connected by a limiting bolt.

Further, an elastic fastener is provided at a lower end of the limiting bolt.

Further, each of the first frame bodies and the second frame bodies is respectively provided with a plurality of light strip slots.

The present utility model has the following beneficial advantages: 1) when in actual use, a plurality of first frame bodies and a plurality of second frame bodies that are alternately connected end to end can form a light decorative frame of a pentagram shape or any other specific shape under the fixation and limitation by the first angle limiting latches and the second angle limiting latches, thus obtaining a decorative light frame with increased aesthetic appeal. 2) The rotational structure which allows disconnection between the corresponding first frame body and second frame body does not require the decorative light frame to be packaged with a specific shape during transportation, thereby reducing transportation and packaging costs. 3) The rotational structure enables the corresponding first frame body and second frame body connected with each other to be also rotatable with respect to each other; when one end which is either the first angle limiting latch or the second angle limiting latch of the corresponding first frame body is disengaged from a corresponding end of the second frame body, the first frame body and the second frame body can still be folded with respect to each other by rotating with respect to each other such that the first frame body and the second frame body are positioned parallel and adjacent to each other with any distance between them substantially eliminated, thereby minimizing the occupied area.

Figure 1:
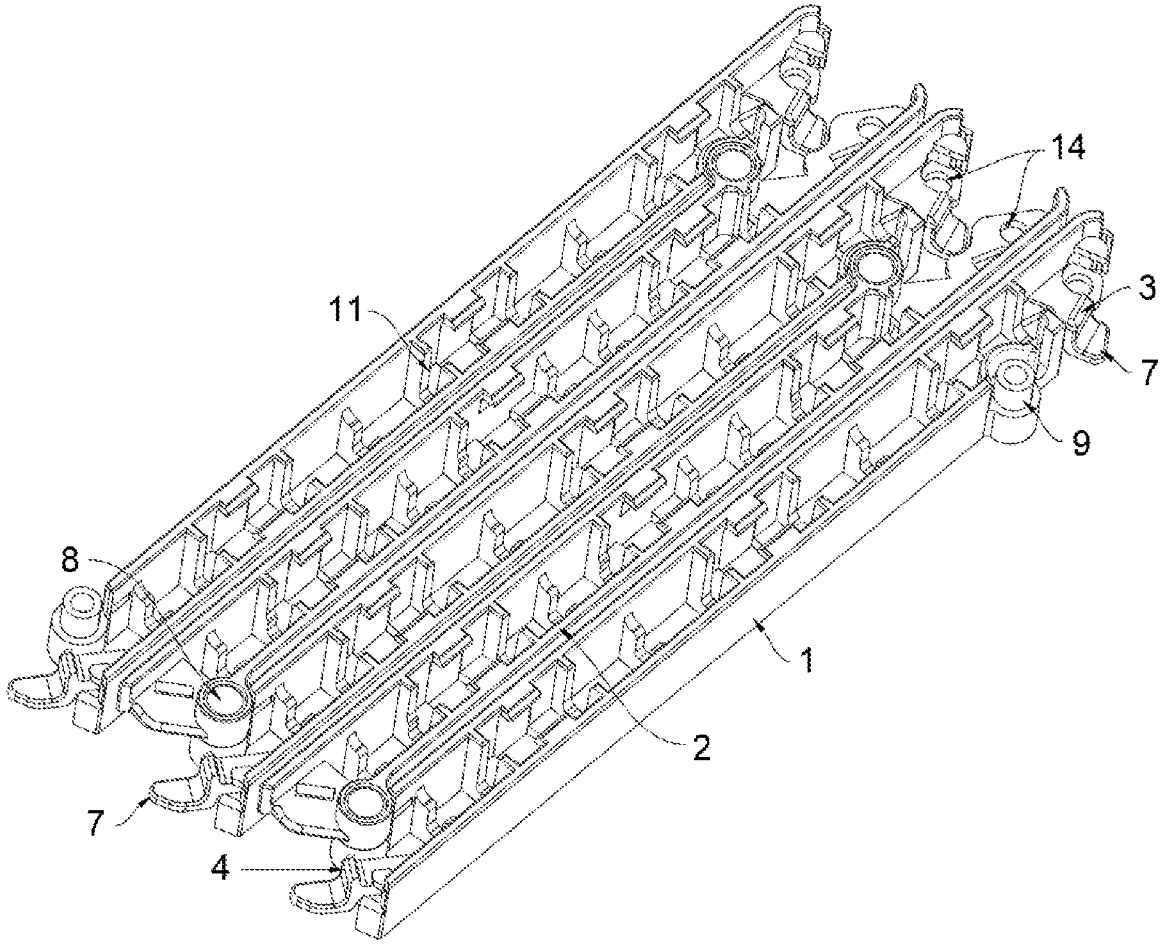
FIG. 1 is a schematic diagram of the modular and foldable decorative light frame shapable into different shape according to the present utility model.

Reference numerals in the figures are as follows: 1 represents a first frame body, 2 represents a second frame body, 3 represents a first angle limiting latch, 4 represents a second angle limiting latch, 5 represents a first abutting part, 6 represents a second abutting part, 7 represents a pulling part, 8 represents a limiting bolt, 9 represents a rotational shaft, 10 represents a shaft sleeve, 11 represents a light strip slot, 12 represents an elastic fastener, 13 represents a limiting buckle, and 14 represents a through hole.

DETAILED DESCRIPTION OF THE INVENTION

With reference to the drawings and specific embodiments, a further detailed description of the present utility model is provided below.

Embodiment 1

In this embodiment, referring to FIGS. 1 to 6, the modular and foldable decorative light frame shapable into different shapes comprises a plurality of first frame bodies 1 and a plurality of second frame bodies 2, and the plurality of first frame bodies 1 and the plurality of second frame bodies 2 are sequentially and alternately connected end to end. A first angle limiting latch 3 and a second angle limiting latch 4 are provided at two ends of each of the first frame bodies 1 respectively, and each of the first angle limiting latch 3 and the second angle limiting latch 4 cooperatively engages with a corresponding second frame body 2.

A first abutting part 5 and a second abutting part 6 are provided at two ends of each of the second frame bodies 2 respectively; and each of the first abutting part 5 and the second abutting part 6 cooperatively engages with a corresponding first frame body 1. When forming the first frame bodies 1 and the second frame bodies 2 into a specific shape, the first angle limiting latch 3 of any first frame body is in cooperative relationship with the first abutting part 5 of a corresponding second frame body 2, and the second angle limiting latch 4 of said first frame body is in cooperative relationship with another corresponding second frame body 2. Specifically, when the first angle limiting latch 3 of said first frame body 1 engages with said corresponding second frame body 2, the first abutting part 5 of said corresponding second frame body 2 will also abut against said first frame body 1; similarly, when the second angle limiting latch 4 of said first frame body 1 engages with said another corresponding second frame body 2, the second abutting part 6 of said another corresponding second frame body 2 will abut against said first frame body 1.

Figure 5:
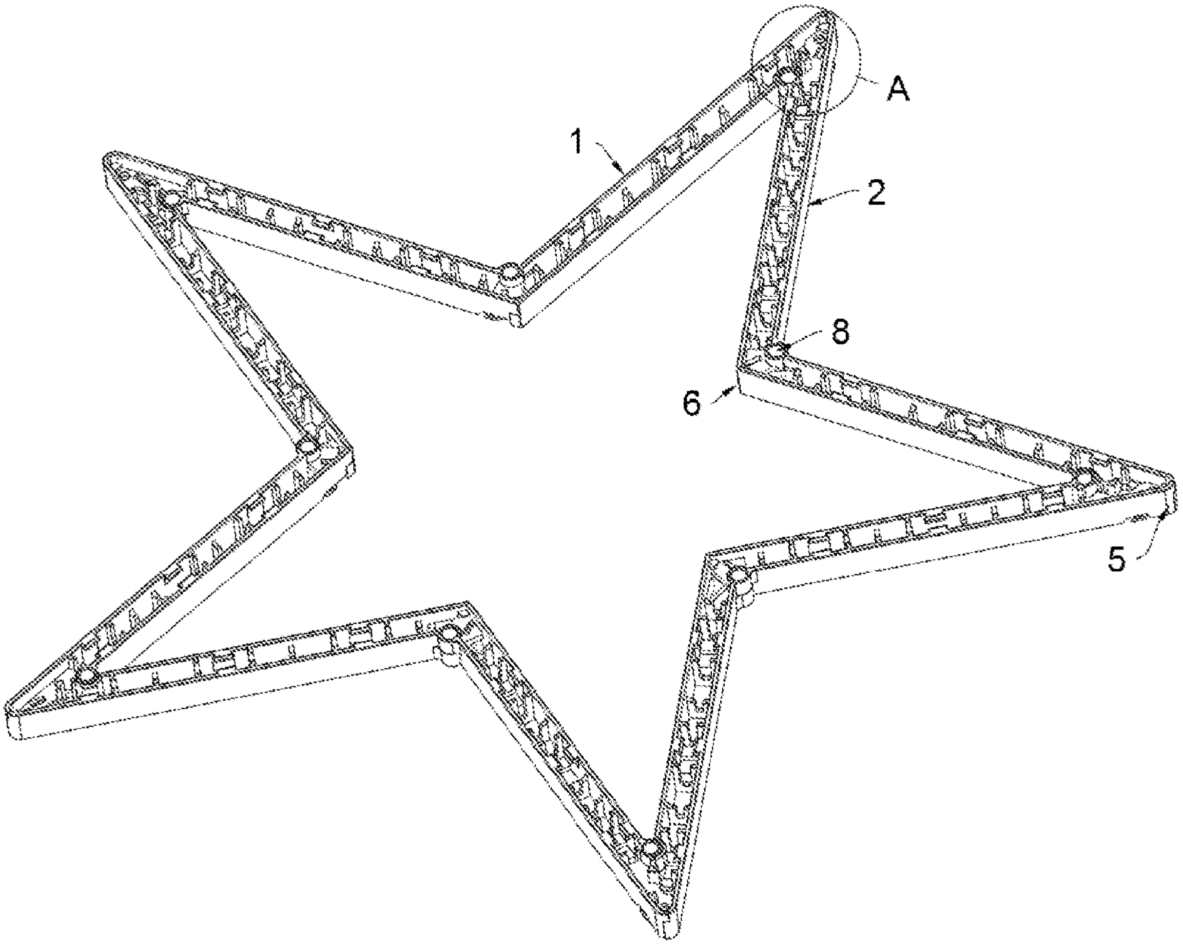
FIG. 5 is a schematic diagram of the modular and foldable decorative light frame according to the present utility model, shaped into a specific shape.
Figure 6:
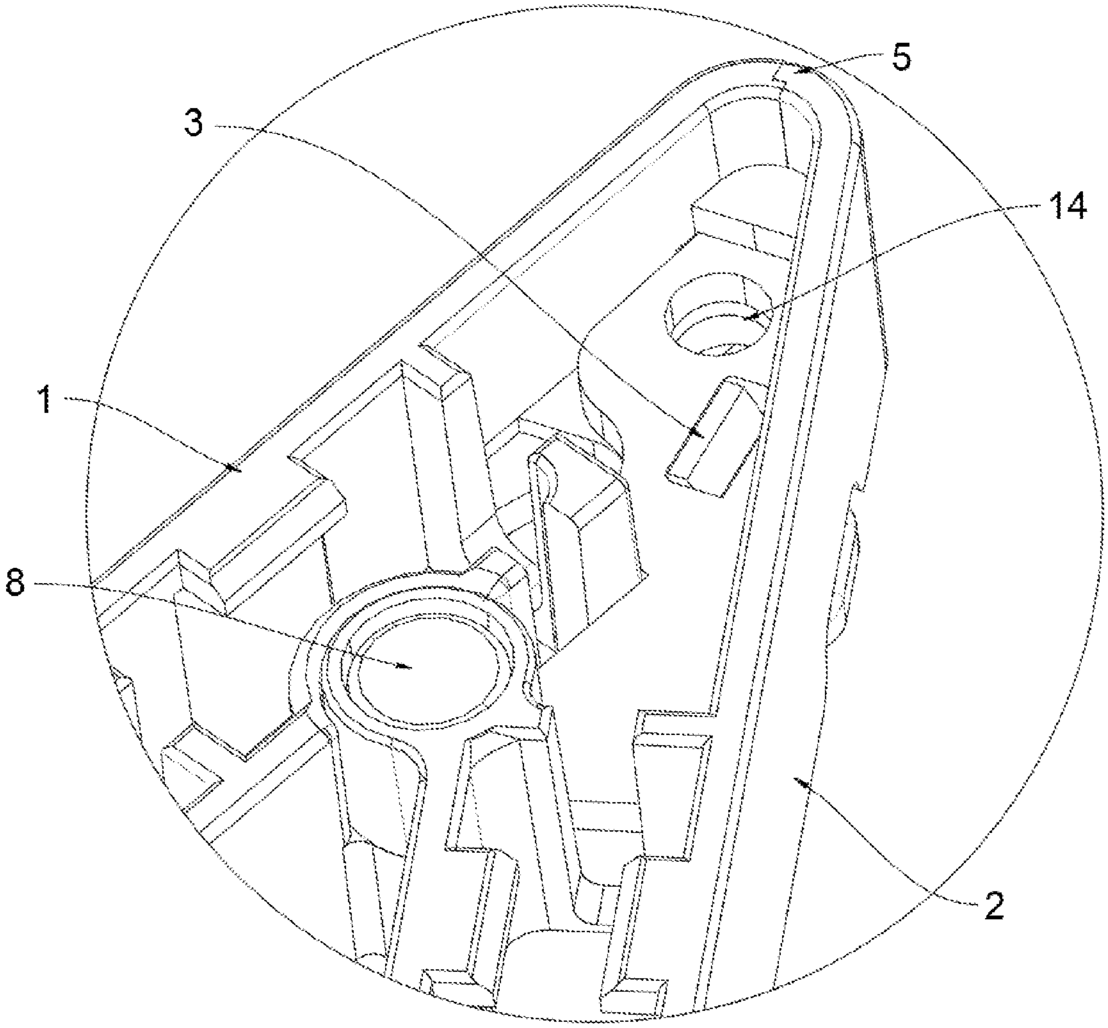
FIG. 6 is an enlarged view of portion A in FIG. 5.

In this embodiment, a fixed limiting angle between the first angle limiting latch 3 of each of the first frame bodies 1 and a corresponding first abutting part 5 of a corresponding second frame body 2 is 36 degrees, and a fixed limiting angle between the second angle limiting latch 4 of each of the first frame bodies 1 and a corresponding second abutting part 6 of a corresponding second frame body 2 is 108 degrees. By setting these angles, when five first frame bodies 1 and five second frame bodies 2 are connected alternately end to end, they can form a pentagram shape, as shown in FIG. 5. When in actual use, the two fixed limiting angles as described above can be adjusted and changed according to different shapes and patterns.

Each of the first angle limiting latch 3 and the second angle limiting latch 4 of each of the first frame bodies 1 is extended outwardly to form a pulling part 7, and the pulling part 7 is provided to facilitate disengagement of the first angle limiting latch 3 and the second angle limiting latch 4 from corresponding second frame bodies which they are engaged to, thereby increasing the efficiency of disengagement.

Each of the five first frame bodies 1 and the five second frame bodies 2 is respectively provided with a plurality of light strip slots 11 configured to accommodating LED light strips, thus enabling the LED light strips to be fixed within the light strip slots 11. Furthermore, each of the first frame bodies 1 and the second frame bodies 2 is respectively provided with at least one limiting buckle 13 assembled thereon to further secure the installation of the LED light strips. Each of the first frame bodies 1 and the second frame bodies 2 is provided with a through hole 14 at one end thereof; once the arrangement of the LED light strips is completed, external ropes or nails can be configured to pass through the through holes 14 for further assembly and fixation.

Figure 2:
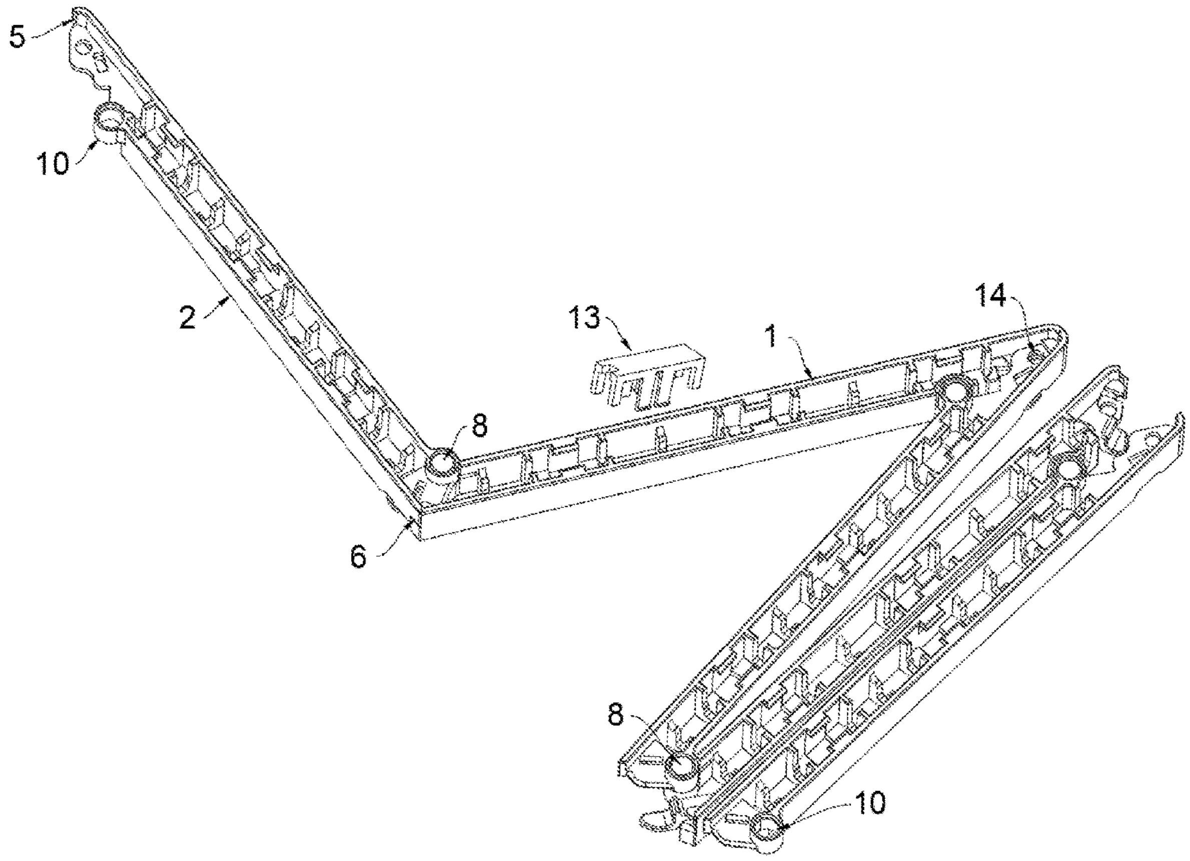
FIG. 2 is a schematic diagram of the usage of the modular and foldable decorative light frame shapable into different shape according to the present utility model.

As shown in FIG. 2, during use, corresponding first frame body 1 and second frame body 2 connected with each other are rotatably connected with each other around a center of a limiting bolt 8. Such rotatable design allows for easy transformation into different shapes and patterns. Additionally, when one end which is either the first angle limiting latch 3 or the second angle limiting latch 4 of the corresponding first frame body 1 is disengaged from a corresponding end of the second frame body 2, the first frame body 1 and the second frame body 2 can still be folded with respect to each other by rotating with respect to each other about the limiting bolt such that the first frame body 1 and the second frame body 2 are positioned parallel and adjacent to each other with any distance between them substantially eliminated, thereby minimizing the occupied area and reducing transportation costs.

The corresponding first frame body 1 and second frame body 2 connected with each other are rotatably and detachably connected with each other around the center of the limiting bolt 8 through a rotational structure, such that the corresponding first frame body 1 and second frame body 2 are rotatable with respect to each other through the rotational structure. Specifically, the rotational structure comprises a rotational shaft 9 and a shaft sleeve 10 provided on the first frame body 1 and the second frame body 2 respectively; the rotational shaft 9 is inserted into the shaft sleeve 10. The rotational shaft 9 and the shaft sleeve 10 are connected by the limiting bolt 8, and an elastic fastener 12 is provided at a lower end of the limiting bolt 8.

Figure 3:
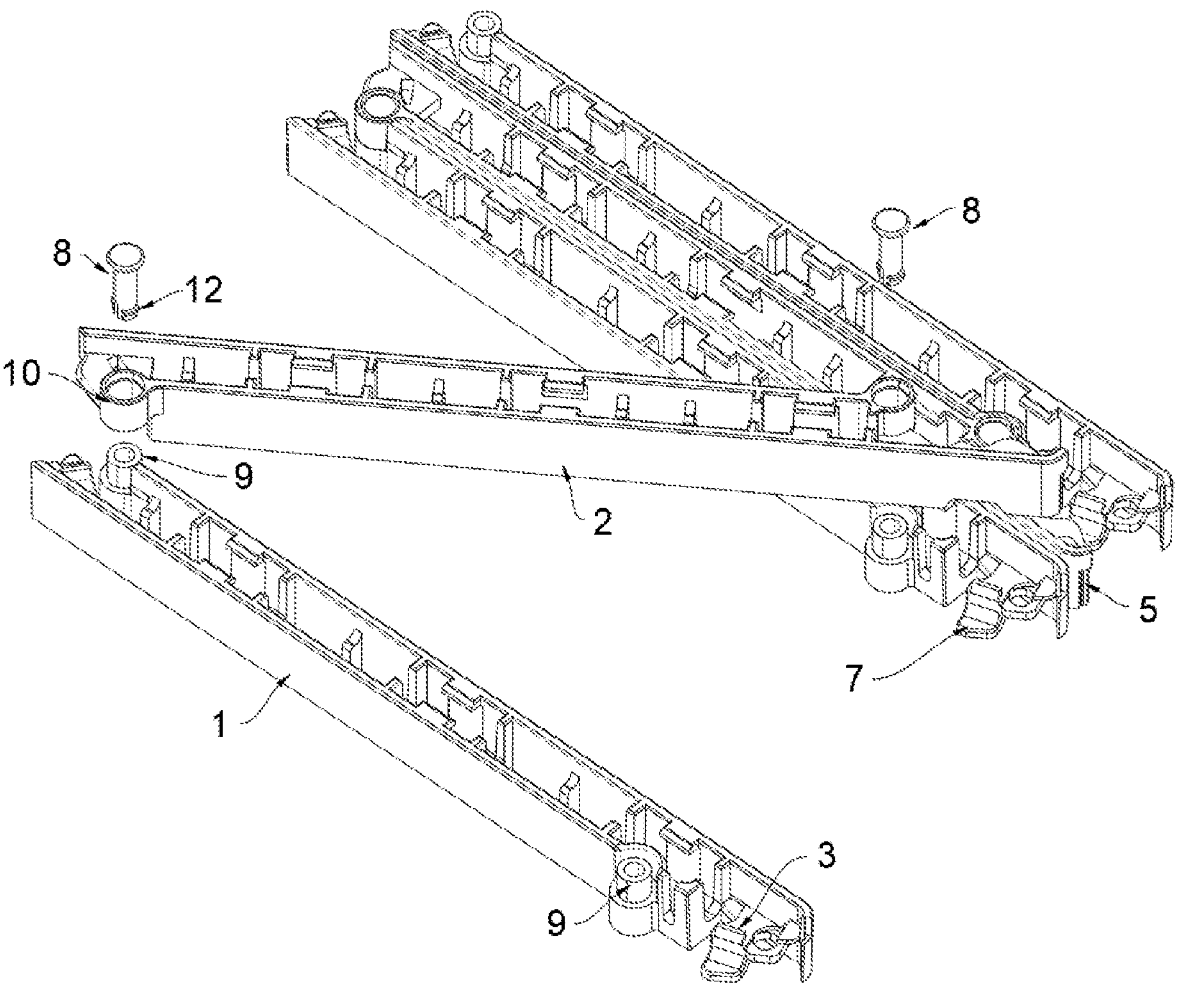
FIG. 3 is a first partially exploded view of the modular and foldable decorative light frame shapable into different shape according to the present utility model.
Figure 4:
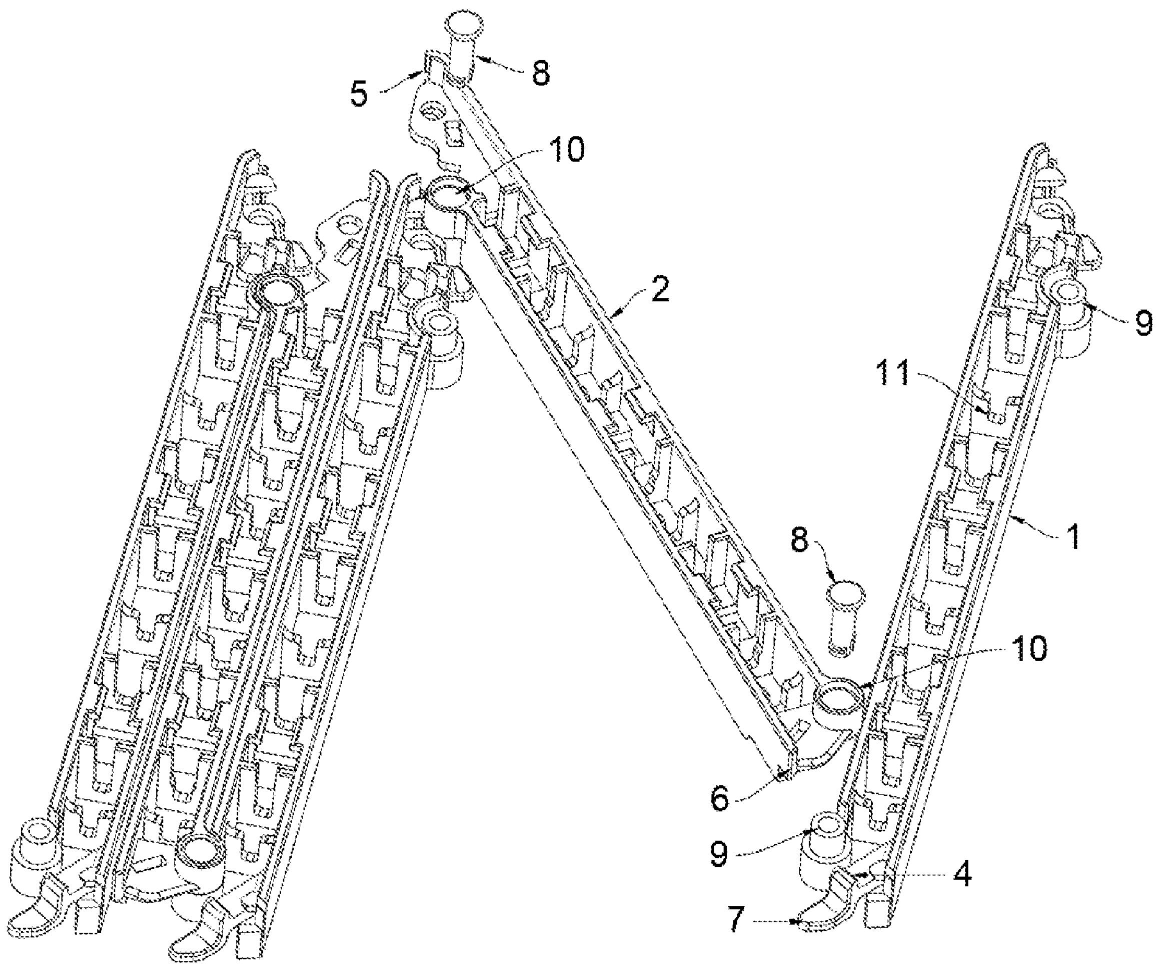
FIG. 4 is a second partially exploded view of the modular and foldable decorative light frame shapable into different shape according to the present utility model.

As shown in FIGS. 3-4, when the rotatable connection between the corresponding first frame body 1 and second frame body 2 is required to be disconnected, press the elastic fastener 12 to allow the rotational shaft 9 and the shaft sleeve 10 to be free from the constraint of the limiting bolt 8, thereby enabling separation of the corresponding first frame body 1 and second frame body 2. The rotational structure which allows disconnection between the corresponding first frame body 1 and second frame body 2 does not require the decorative light frame to be packaged with a specific shape during transportation, thereby reducing transportation and packaging costs.

As shown in FIG. 5, when in actual use, five first frame bodies 1 and five second frame bodies 2 that are alternately connected end to end can form a light decorative frame of a pentagram shape under the fixation and limitation by the first angle limiting latches 3 and the second angle limiting latches 4 of all the first frame bodies 1 as well as the first abutting parts 5 and the second abutting parts 6 of all the second frame bodies 2, thus a decorative light frame with increased aesthetic appeal is obtained.

Embodiment 2

Figure 7:
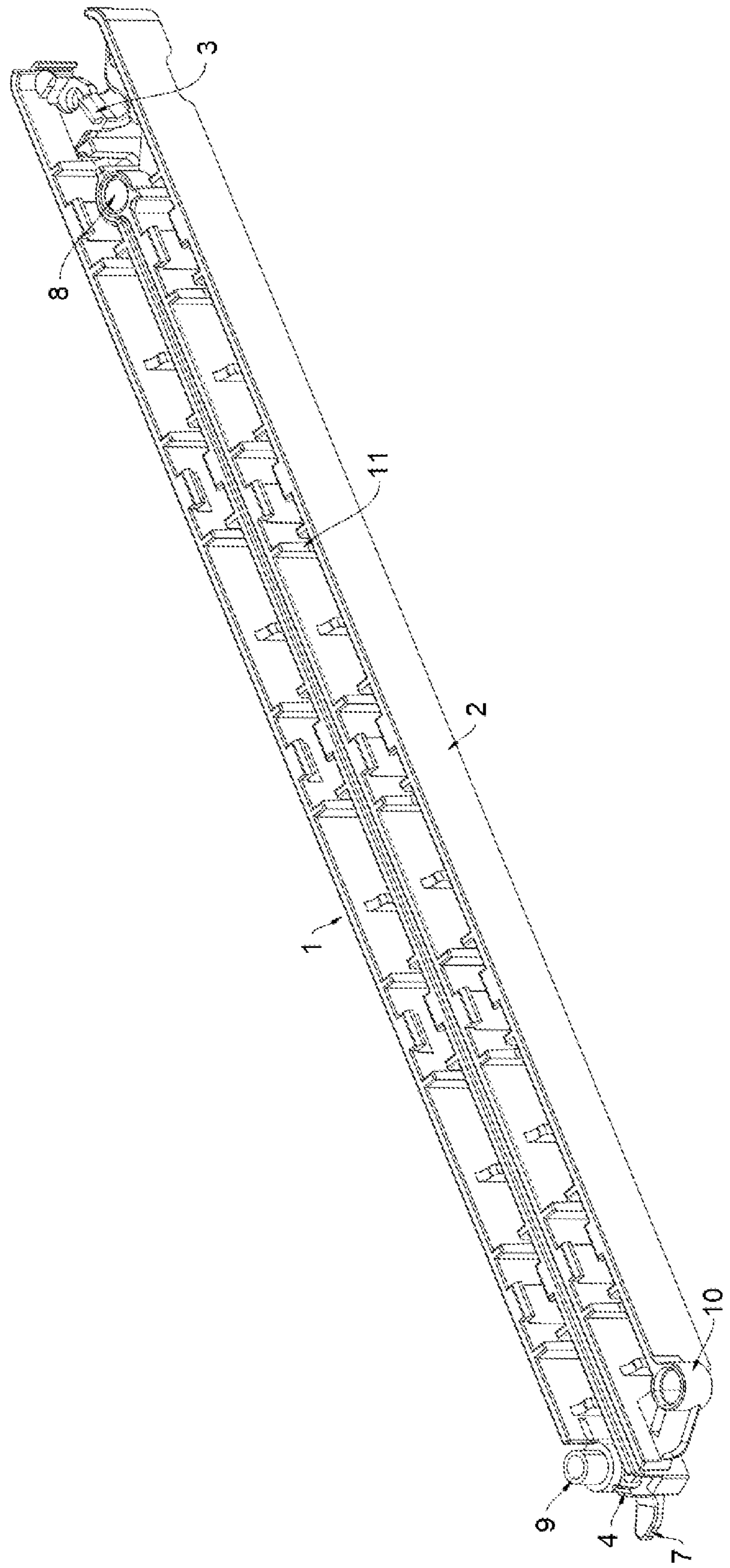
FIG. 7 is a schematic diagram of a pair of corresponding first frame body and second frame body according to embodiment 2 of the modular and foldable decorative light frame shapable into different shape of the present utility model.

As shown in FIG. 7, the difference between this embodiment and Embodiment 1 is that each of the first frame bodies 1 has a longer length, and each of the second frame bodies 2 also has a longer length. However, the light strip slots 11 provided in each of the first frame bodies 1 and each of the second frame bodies 2 are of the same density compared to embodiment 1.

Embodiment 3

Figure 8:
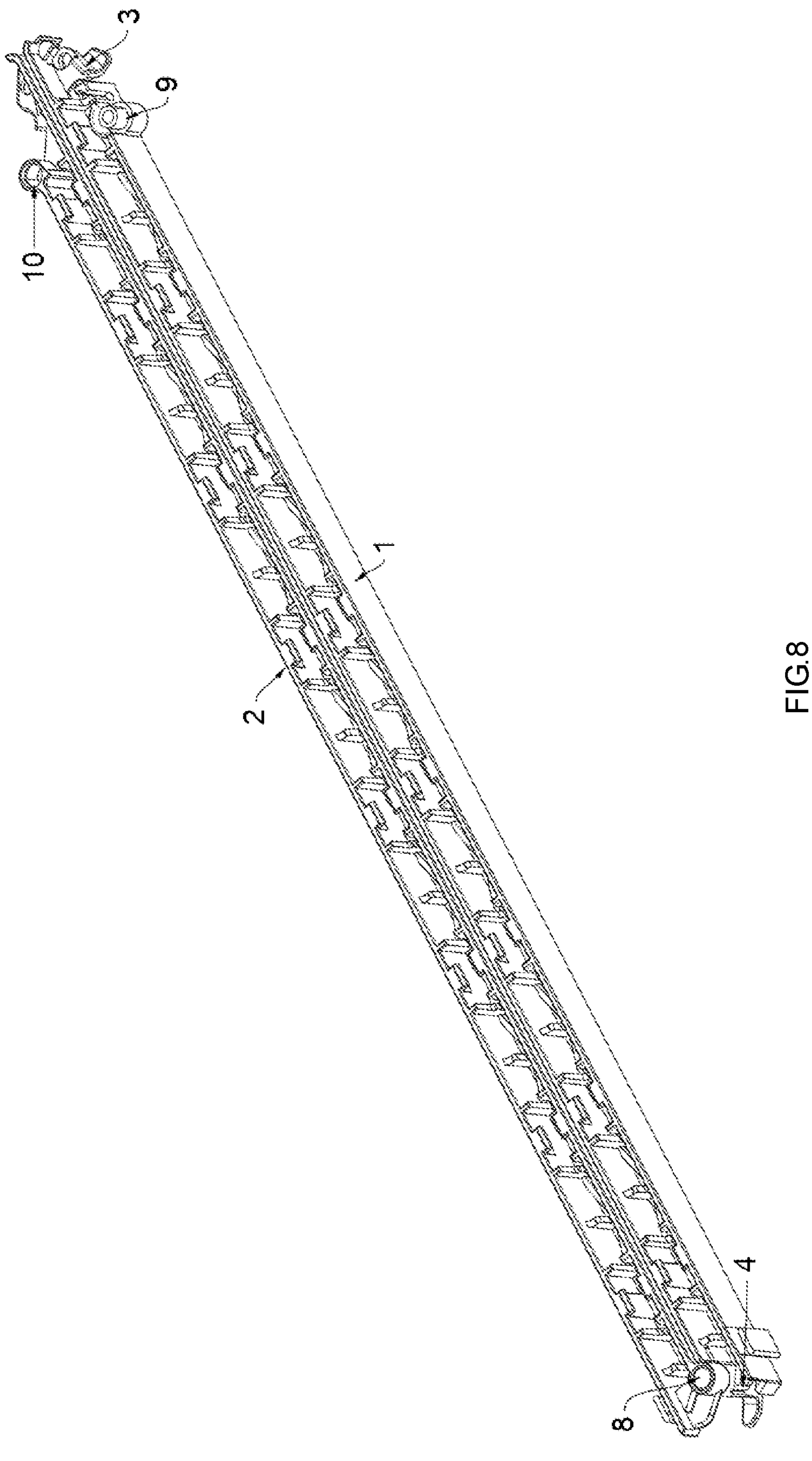
FIG. 8 is a schematic diagram of a pair of corresponding first frame body and second frame body according to embodiment 3 of the modular and foldable decorative light frame shapable into different shape of the present utility model.

As shown in FIG. 8, the difference between this embodiment and Embodiment 2 is that each of the first frame bodies 1 has a longer length, and each of the second frame bodies 2 also has a longer length. However, the light strip slots 11 provided in each of the first frame bodies 1 and each of the second frame bodies 2 are of the same density compared to embodiment 2.

Embodiment 4

Figure 9:
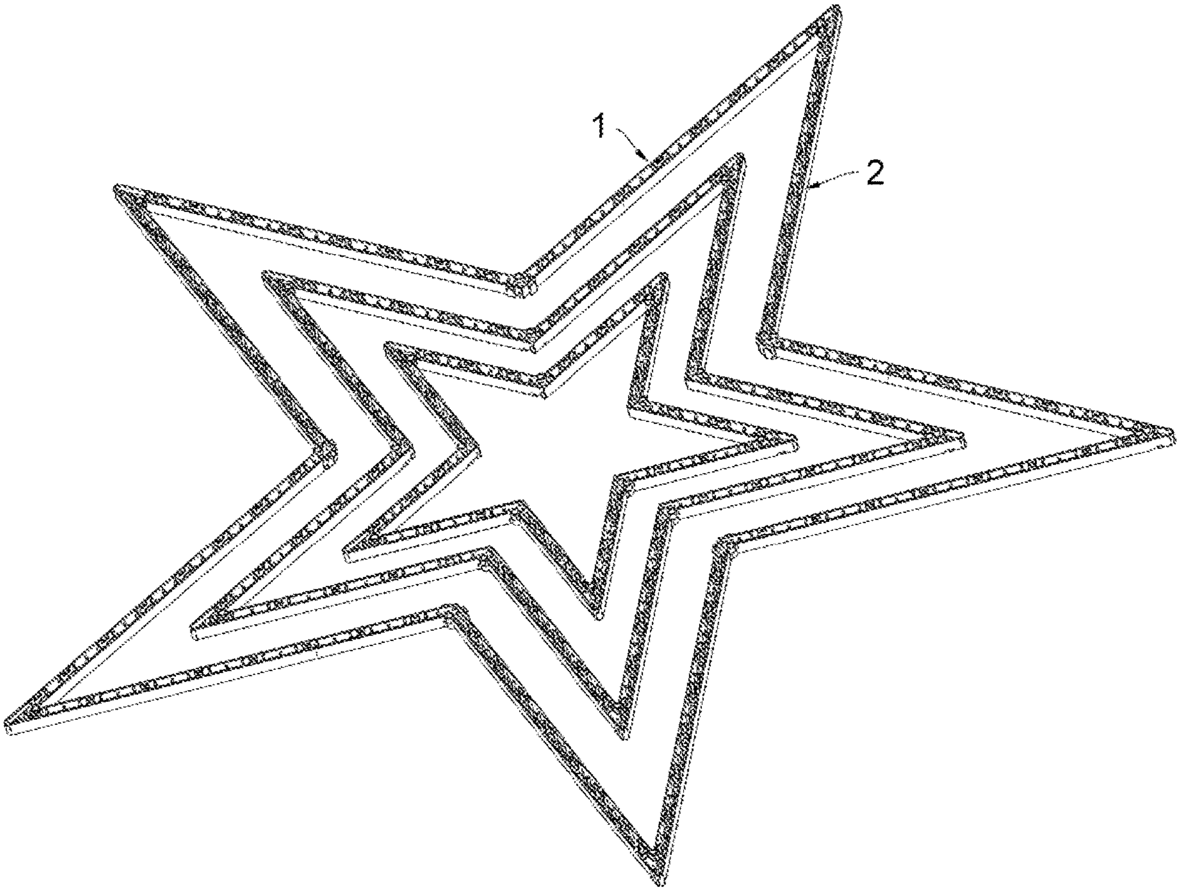
FIG. 9 is a schematic diagram according to embodiment 4 of the present utility model, wherein the modular and foldable decorative light frames according to embodiments 1 to 3 are used together to form a specific shape.

As shown in FIG. 9, in this embodiment, the first frame bodies 1 and the second frame bodies 2 from each of the embodiments 1 to 3 are used to form a pentagram respectively, such that three pentagrams of different sizes are obtained, and the three pentagrams are placed together, which is a common decoration in the market.

The above description merely illustrates the preferred embodiments of the present utility model and is not intended to make any form of limitation on the present utility model. Although the present utility model has been disclosed with the preferred embodiments as mentioned above, it is not intended to limit the present utility model. Any of those skilled in the art, without departing from the technical scope of the present utility model, may make some changes or modifications according to the disclosed technical content to form equivalent embodiments. As long as these simple amendments, equivalent changes, and modifications fall within the technical scope of the present utility model based on the disclosed teachings of the present utility model, they are all considered to be within the scope of the present utility model.

What is claimed is:

1. A modular and foldable decorative light frame shapable into different shapes, comprising a plurality of first frame bodies and a plurality of second frame bodies, and the plurality of first frame bodies and the plurality of second frame bodies are sequentially and alternately connected end to end; each pair of adjacent first frame body and second frame body are detachably connected with each other through a rotational structure, and said each pair of adjacent first frame body and second frame body are also rotatable with respect to each other through the rotational structure; a first angle limiting latch and a second angle limiting latch are provided at two ends of each of the first frame bodies respectively, and each of the first angle limiting latch and the second angle limiting latch cooperatively engages with a corresponding second frame body respectively; a pulling part is separately formed on each of the first angle limiting latch and the second angle limiting latch of each of the first frame bodies independent from the rotational structure, and each pulling part extends perpendicularly from a respective first angle limiting latch and a respective second angle limiting latch.

2. The modular and foldable decorative light frame of claim 1, wherein a first abutting part and a second abutting part are provided at two ends of each of the second frame bodies respectively; and each of the first abutting part and the second abutting part cooperatively engages with a corresponding first frame body respectively.

3. The modular and foldable decorative light frame of claim 1, wherein each of the first frame bodies and the second frame bodies is provided with a through hole at one end thereof.

4. The modular and foldable decorative light frame of claim 1, wherein the rotational structure connecting said each pair of adjacent first frame body and second frame body comprises a rotational shaft and a shaft sleeve provided on the first frame body and the second frame body respectively; the rotational shaft is inserted into the shaft sleeve; the rotational shaft and the shaft sleeve are connected by a limiting bolt.

5. The modular and foldable decorative light frame of claim 4, wherein an elastic fastener is provided at a lower end of the limiting bolt.

6. The modular and foldable decorative light frame of claim 1, wherein each of the first frame bodies and the second frame bodies is respectively provided with a plurality of light strip slots.

* * * * *